United States Patent [19]

White et al.

[11] 3,895,896
[45] July 22, 1975

[54] APPARATUS FOR PULTRUDING HOLLOW OBJECTS

[75] Inventors: Roger B. White, Shaker Heights; David E. Pearson, Hudson; Hugo E. Birkner, Jr., Kent, all of Ohio

[73] Assignee: The Pultrusions Corporation, Kent, Ohio

[22] Filed: Mar. 11, 1974

[21] Appl. No.: 449,701

Related U.S. Application Data

[62] Division of Ser. No. 303,648, Nov. 3, 1972, abandoned.

[52] U.S. Cl. .................. 425/93; 264/137; 425/112; 415/114; 425/391
[51] Int. Cl. ........................................... B29d 23/05
[58] Field of Search .................. 264/134, 136, 137; 425/505, 114, 515, 517, 6, 66, 71, 93, 70, 67, 391, 112

[56] References Cited
UNITED STATES PATENTS

| | | | |
|---|---|---|---|
| 3,185,603 | 5/1965 | Boggs | 264/137 X |
| 3,306,797 | 2/1967 | Boggs | 264/137 X |
| 3,448,489 | 6/1969 | Boggs | 425/380 X |
| 3,530,212 | 9/1970 | Kienle et al. | 264/137 |

FOREIGN PATENTS OR APPLICATIONS

| | | | |
|---|---|---|---|
| 58,227 | 1913 | Austria | 425/6 |
| 590,034 | 1947 | United Kingdom | 264/137 |

Primary Examiner—R. Spencer Annear
Assistant Examiner—Mark Rosenbaum
Attorney, Agent, or Firm—Hamilton, Renner & Kenner

[57] ABSTRACT

Apparatus and method for the continuous manufacture of hollow articles formed of fiber and liquid, heat curable resin material. The articles are made by folding ribbons of fiber mat, while dry, over and around one or more mandrels having an exterior configuration which delineates the hollow cavity, or cavities, extending longitudinally through the article. The folded disposition of the mat ribbons is maintained rather precisely thereafter to minimize puckering and/or drag as they move to, and through the die. Only after the mat ribbons are folded is the resin applied to the mat. Even though a quantity of resin sufficient, or in excess of the amount required, to impregnate the mat may be applied, it is applied in such a way that the mat is preferably wetted only partially. Strands of roving and/or, if desired, a wire reinforcement, may be drawn simultaneously into a die with the partially impregnated, folded mat. The aperture between the mandrel and the die progressively constricts causing hydraulic pressure to complete the impregnation of the mat. The application of heat to the die cures the resin, forming a composite article which is continuously drawn from the die.

15 Claims, 14 Drawing Figures

APPARATUS FOR PULTRUDING HOLLOW OBJECTS

This is a Division of Application Ser. No. 303,648, filed Nov. 3, 1972, now Continuation Application Ser. No. 502,814 filed Sept. 3, 1974.

BACKGROUND OF THE INVENTION

The present invention relates to a method and apparatus for the continuous pultrusion of articles having predetermined cross section. Although the method and apparatus embodying the concept of the present invention may be used to produce articles of solid cross sectional shapes, they find particular suitability for the production of hollow articles. Methods and apparatus for pultruding articles of solid cross sectional configuration and even sections having a single cavity — such as pipes — have long been available; however, the pultrusion of cross sectional configurations having relatively thin walls reinforced with mat, multiple cavities and/or an unpuckered disposition of the mat reinforcing within the walls of the article has heretofore been deemed impractical. Two unique articles which typify the results that can be obtained with such a method and on such apparatus are also disclosed.

A host of reinforcing materials may be used in combination with a wide variety of matrices to achieve the desired cross sectional configuration by pultrusion, but by and large the vast majority of pultruded articles comprise a resin material incorporating fiber or fibrous reinforcement — more specifically, liquid, thermosetting resins incorporating fiber glass roving, fabrics or mats as the reinforcing material.

Since the early 1960's data compiled from performance studies and tests have borne out the high strength of fiber glass reinforced resin articles, and pultrusion has afforded a highly successful manufacturing technique for producing such articles in lengths of uniform, predetermined cross section. The prior art reveals considerable refinement in pultrusion apparatus and teaches the use of highly sophisticated mechanisms for: winding the reinforcing filaments around the mandrel, rotating the mandrel, rotating the forming die, pulling the formed article through the die, staging the heating and cooling of the die and impregnating the reinforcing filaments with the resin. Nevertheless, the basic pultrusion technique has remained substantially unchanged.

To summarize the basic pultrusion technique, the reinforcing materials are drawn continuously through an impregnating bath of liquid resin and into a heated die in which the impregnated reinforcing materials are shaped and the resin cured. The shaped article cools while being drawn to the requisite length, and successive lengths may be drawn and cut from the continuous supply without unduly interrupting the previous stages.

The orientation of the glass fibers within the final article determines the sectional planes through the article along which the greatest strength will be exhibited. Thus, the use of only glass roving disposed longitudinally within a pultruded article to afford reinforcement thereof would provide the maximum strength to the article (in relationship to the amount of reinforcing material used) with respect to those sectional planes which are disposed transversely of the roving but would contribute no strength with respect to those sectional planes aligned parallel with the roving. A woven fabric of glass fibers would achieve desirable strength in all sectional planes but the cost of producing a woven reinforcing fabric is too prohibitive to make its use economical for many applications.

Accordingly, those skilled in this art would prefer to employ matting in which the fibers are oriented in a random pattern. Such matting can be produced with sufficient economy to warrant its use as a reinforcing material in pultruded articles, and after being impregnated and cured within a resin matrix matting in which the fibers are oriented in a random pattern can also impart a multidirectional reinforcement substantially equivalent to a woven fabric. However, such matting generally has insufficient strength, particularly after it has been wetted, to resist the tensile stresses imparted thereto as it is drawn through a die, and as a result, according to the prior known pultrusion processes: such matting is itself often reinforced with roving aligned in the direction along which the mat is to be drawn into the die; the resin bath is positioned in the closest possible proximity to the mouth of the die (even to the point of having the resin reservoir in direct contact with the mouth of the die); and/or, the mat is often sandwiched between a plurality of roving strands to maintain its integrity as it is sequentially impregnated and drawn into the shaping die. Each of these measures, however, increases the cost of the pultruding articles, and, by virtue of the present invention, unnecessarily. Even though such prior art techniques are scrupulously adopted and followed, when the mat is wetted prior to shaping it tends to pucker when folded, and puckered fabric will jam within the die, or, if the puckered portion of the fabric clears the die, it will severely weaken the structure within which it is incorporated along the line of the pucker.

The foregoing problems are compounded when the article is to be hollow and/or includes thin walled sections, and while the art has developed satisfactory techniques for pultruding articles having single hollow cavities as well as relatively thick walled sections, no known commercially acceptable concept has heretofore been developed for pultruding articles with multiple hollow cavities and/or relatively thin walled sections. For example, in a thick walled section a fold, wrinkle or pucker can be more readily absorbed in the general resiliency afforded by the total thickness of the mat employed whereas in a thin walled section even a single fold, wrinkle or pucker can cause the mat to jam within the throat of the die to stop, or at least interrupt, the process.

SUMMARY OF THE INVENTION

It is, therefore, a primary object of the present invention to provide an apparatus and method for pultruding hollow articles, and particularly articles having a plurality of hollow cavities.

It is a further object of the present invention to provide an apparatus and method, as above, capable of pultruding relatively thin walled sections — i.e., sections within a range of one thirty-secondth to one eighth of an inch in thickness.

It is another object of the present invention to provide an apparatus and method, as above, by which the article itself, and particularly the web walls between adjacent hollow cavities can be reinforced with relatively inexpensive mat that may, if desired, be itself devoid of roving or other longitudinal reinforcement and which can be introduced into relatively thin walled webs without being sandwiched between such strands of roving or other reinforcing means.

It is still another object of the present invention to provide an apparatus and method, as above, by which strands of metallic reinforcing can be employed within the pultruded objects, at least two such resulting configurations themselves being new and novel.

It is an even further object of the present invention to provide an apparatus capable of performing the method, both as above, that is relatively inexpensive to build, operate and maintain.

These and other objects, together with the advantages thereof over existing and prior art forms, which will become apparent from the following specification, are accomplished by means hereinafter described and claimed.

In general, an apparatus embodying the concept of the present invention has a first creel means on which a plurality of bobbins are mounted to pay out continuous ribbons of reinforcing mat. A forming guide folds each ribbon of mat into the desired configuration for that mat and locates each folded ribbon of mat in that relationship with the others which it is to assume when encapsulated within the finished article. After the forming guide folds the ribbons into the precise dimensional configuration in which they are to be received within the finished product the folded ribbons are thereafter provided with support of a nature sufficient to maintain their precise relative disposition and thereby obviate undesirable folds, wrinkles or puckers.

An exposure chamber receives the dry ribbons of mat reinforcing (folded and oriented as they leave the forming guide), maintains the ribbons in the configuration received and lays a continuous deposit of resin on at least a portion of the folded ribbons as they are drawn through the exposure chamber. Even though the amount of resin so deposited is preferably sufficient (in fact, preferably in excess of the amount required) to achieve hydraulic pressure within the die (as is hereinafter more fully described) and thereby entirely impregnate the ribbons of dry, folded mat, because of the manner in which the resin is deposited thereon only a portion of the mats will be thoroughly impregnated — thus allowing the largely unwetted remainder to maintain the tensile integrity of the ribbons as they are drawn into the die.

A second creel means supports a plurality of bobbins for paying out roving and/or other reinforcing strands which may be bathed in resin. In fact, when a multi-filament strand of roving is used it is highly desirable to pass the roving through a resin bath in order to enhance the penetration of the resin into the interstices between the filaments in the strand. A heated die receives the partially impregnated ribbons of mat (still folded and oriented as they leave the forming guide) together with the roving. A pulling mechanism located downstream of the die continuously extracts the article at a rate which permits the resin to cure within the die and thereby draws the mat and roving from their respective creel means to and through the various intermediate stations as well as the die.

According to one preferred method for making a multi-cavity, hollow article on the subject apparatus, continuous ribbons of fiber glass matting are drawn from the pay off bobbins on the first creel means and through the forming guide. The action of the mat ribbons against the forming guide causes the ribbons to be folded over and around the mandrels, or extensions thereof, that form the interior surfaces of the hollow cavities. In order to achieve success with the relatively inexpensive random pattern mat it is imperative that the mat be formed dry, because as soon as the mat becomes wet — even with the resin — it loses sufficient tensile strength that the drag encountered by engagement of the mat against the forming guide and/or the die can tear the mat.

After the ribbons have been folded they are partially impregnated within an exposure chamber which constitutes a continuation of the aperture cross section defined between the forming guides and the mandrel means to maintain the folded configuration of the ribbons.

Contemporaneously with the foregoing steps, continuous strands of fiber glass roving may be drawn from pay off bobbins on the second creel means and pass through a resin bath in which at least the surfaces of the strands are coated with resin. The coated strands are drawn into the mouth of the die about the substantial periphery thereof. The cooperative cross sectional dimensions of the die and mandrel means therein cooperate to build a hydraulic pressure within the constricting canal defined as that area of the passageway within the throat of the die between the mandrel means and between the mandrel means and die that progressively constricts over a predetermined axial extent longitudinally of the die fully to impregnate the mat ribbons and even the roving. The tapered cross section of the constricting canal, especially in the area of the web sections being formed, for example, between the mandrels, together with the excess resin which has been applied to the entering layup of mat (and roving, if employed) causes hydraulic pressure to develop before the mat (or roving) is fully compressed. Accordingly, the resin can penetrate the interstices of the loosely compacted mat even in the difficult thin walled sections to achieve complete impregnation of the reinforcing material throughout the entirety of the article being made.

It should be appreciated that metallic reinforcing strands, or the like, may be used in conjunction with, or in lieu of, the multi-filament fiber glass roving, in which case there would be relatively little need for passing the reinforcing strands through a resin bath.

Heat applied to the die downstream with respect to the constricting canal cures the resin so that a pulling mechanism can extract the finished article in substantially continuous lengths.

According to an alternative embodiment, a dry mat material may also be drawn into the die at the entrance thereof in order to become the outermost element of material on, or encapsulated within, the resin. It must also be appreciated that some materials can only be so applied. The selection of the outer layer of mat may be instrumental in determining: the surface texture of the finished article; the color; the appearance; the weathering characteristics; and/or, the chemical resistance thereof — and any excess resin carried by the roving and/or mat has also been found sufficient to impregnate this mat under the effect of the hydraulic pressure within the die, if impregnation is required. It may also be desirable to employ a plastic film which will itself constitute the outer surface of the article.

One preferred embodiment of apparatus in which articles having multiple, hollow cavities may be made, together with two exemplary forms of such articles, are shown by way of example in the accompanying drawings and described in detail, along with the method of the subject invention, without attempting to show all of the various forms and modifications in which the invention might be embodied; the invention being measured by the appended claims and not by the details of the specification.

DESCRIPTION OF THE DRAWINGS

FIG. 12 is a vertical section taken substantially on line 12—12 of FIG. 10, depicting the cross section of an exemplary article having multiple cavities therethrough which can be pultruded with apparatus embodying the concept of the present invention and according to the method thereof, said FIG. 12 appearing on the same sheet of drawings as FIG. 3;

DESCRIPTION OF THE PREFERRED EMBODIMENTS

Figure 1:
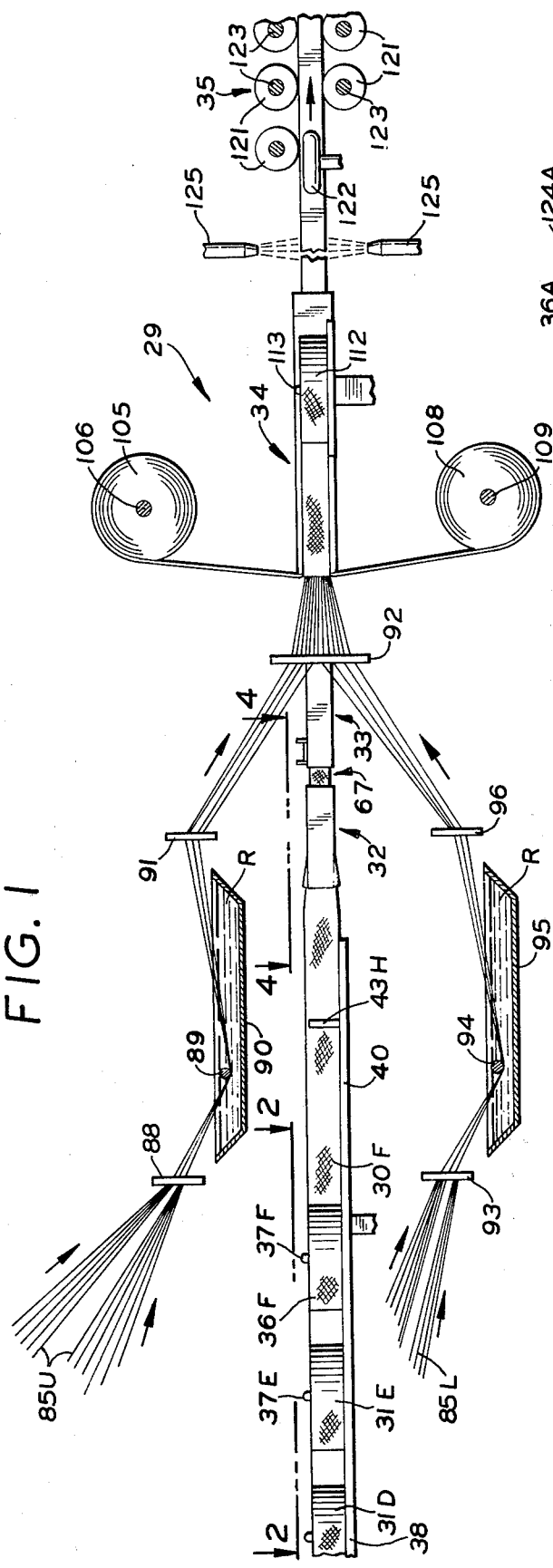
FIG. 1 is a schematic, side elevation of an exemplary apparatus embodying the concept of the present invention and suitable for making articles from fiber reinforced resin and having multiple hollow cavities, all according to the method thereof.

Referring more particularly to the drawings, a hollow, multicavity article, indicated generally by the numeral 20, is depicted in FIG. 12 and is representative of the type of article which may be pultruded by the subject apparatus and according to the subject method. The article 20, of rectilinear cross sectional outline, has vertically spaced upper and lower face walls 21 and 22, respectively, left and right lateral side walls 23 and 24, respectively (the face and side wall comprising the peripheral walls of article 20), and two inner, web walls 25 and 26 which combine to define three hollow cavities 28A, 28B and 28C that extend longitudinally through the article 20.

An overall view of one preferred form of apparatus embodying the concept of the present invention is depicted in FIG. 1 and identified generally by the numeral 29.

A plurality of ma ribbons 30 are sequentially drawn from their individual bobbins 31 into and through a forming guide 32, an exposure chamber 33 and a heated die 34 by means of a pulling mechanism 35, as will be hereinafter described in detail. By virtue of the novel apparatus 29 the ribbons 30 need not be reinforced but may be the relatively inexpensive "continuous strand" or even "jackstraw" matting.

Continuous strand matting is made by continuously extruding fine, fiber glass strands from a plurality of extruding heads that are moved back and forth in a random pattern across a moving conveyor. A light binder affords a degree of integrity to the mat so that it may be handled without separation, but the binder does not afford sufficient tensile strength to the mat to allow it to withstand any but the most modest stresses.

Jackstraw mat comprises a plurality of short lengths of fiber glass strands disposed in a purely random arrangement throughout the length of the ribbon. The short lengths of fiber glass are similarly joined by a binder that affords a degree of strength comparable to that encountered in continuous strand matting.

The exemplary article 20 may conveniently utilize six mat ribbons designated as 30A, 30B, 30C, 30D, 30E and 30F, and each ribbon is supplied from a corresponding bobbin 31A, 31B, 31C, 31D, 31E and 31F mounted on independent skewers 37A, 37B, 37C, 37D, 37E and 37F, respectively, presented from a pay off creel 38. The ribbons, separated and maintained vertically erect by baffle walls 39A, 39B, 39C, 39D, 39E and 39F are drawn along a slideway 40 which is located at the side of the creel 38 and which doglegs laterally to direct the individual ribbons into their proper vertical disposition with respect to the mandrel extensions 41A, 41B and 41C which anchor the mandrels 42A, 42B and 42C within the die 34 (FIG. 7) and are themselves anchored at their upstream end by means not shown. Thus, as viewed in FIG. 5, mat ribbon 30A is positioned to the right of mandrel extension 41A and when folded to the position depicted in FIG. 6 will become encapsulated within the full span of lateral sidewall 23 and a portion of the face walls 21 and 22 of the exemplary article 20. Mat ribbons 30B and 30C are positioned between mandrel extensions 41A and 41B and will similarly become encapsulated within the full span of web wall 25 and a portion of the face walls 21 and 22. The portions of mat ribbon 30A within face walls 21 and 22 preferably overlap the portions of ribbon 30B within those face walls. In a similar manner, mat ribbons 30D and 30E, positioned between mandrel extensions 41B and 41C, will become encapsulated within the full span of web wall 26 and a portion of face walls 21 and 22 with those portions of ribbons 30C and 30D within the face walls 21 and 22 overlapping. Mat ribbon 30F will become encapsulated within the full span of lateral side wall 24 and a portion of the face walls 21 and 22. Those portions of mat ribbons 30C and 30E within the face walls 21 and 22 also preferably overlap.

A series of guide posts 43A, 43B, 43C, 43D, 43E, 43F and 43G guide the mat ribbons 30A, 30B, 30C, 30D, 30E and 30F between the appropriate baffle walls, and guide post 43H, in conjunction with guide post 43G, maintains mat ribbon 30F adjacent mandrel extension 41C as it is directed thereagainst from the dogleg portion of slideway 40. Curved plates 36A, 36B and 36C mounted on end of mandrel extensions 41A, 41B and 41C, respectively, guide mat ribbons 30B, 30C, and 30E between mandrel extensions 41A, 41B and 41C.

Figure 5:
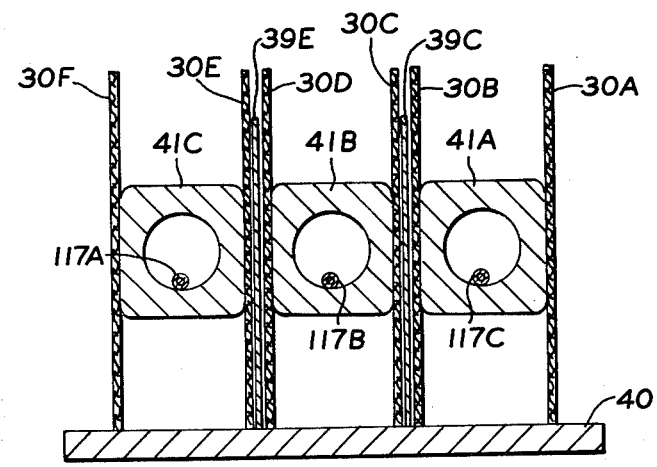
FIG. 5 is a vertical section taken substantially on line 5—5 of FIG. 4, depicting the relationship of the reinforcing ribbons and mandrel extensions before the ribbons are folded.
Figure 6:
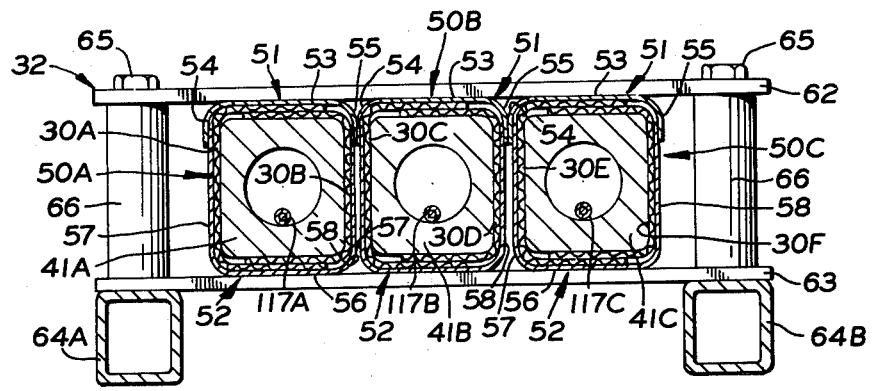
FIG. 6 is a vertical section taken substantially on line 6—6 of FIG. 4, depicting the cross sectional configuration of the reinforcing ribbons after they have been folded.
Figure 7:
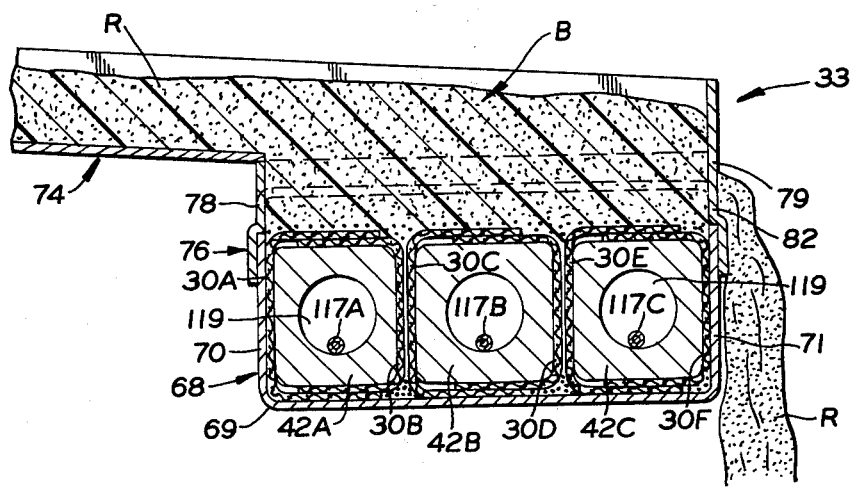
FIG. 7 is a vertical section taken substantially on line 7—7 of FIG. 4, depicting the exposure chamber, supply trough and overflow weir.

In order that portions of mat ribbons 30A through 30F will be disposed (as shown in FIG. 6) so as to be encapsulated within the top and bottom face walls 21 and 22, those portions of each mat ribbon must be displaced from their parallel, vertical attitude (as shown in FIG. 5) by being folded over and under the corresponding mandrel extensions. The required folding may be accomplished with facility by the use of flared turning vanes in the forming guide 32.

Figure 4:
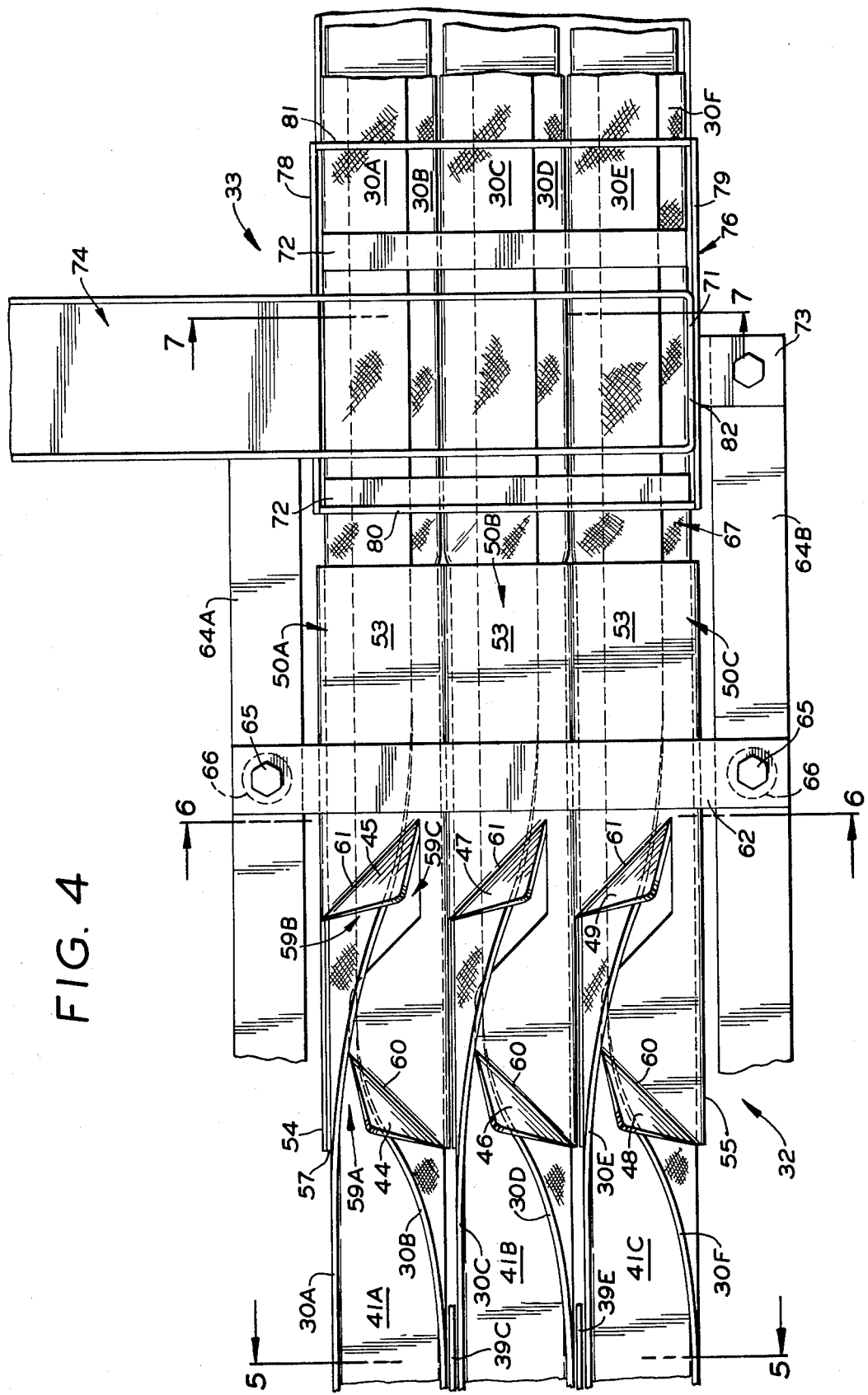
FIG. 4 is an enlarged top plan taken substantially on line 4—4 of FIG. 1, depicting the forming guide and exposure chamber.

Referring particularly to FIG. 4, vane 44, by progressive deflection, folds ribbon 30B downwardly toward the uppermost surface of mandrel extension 41A, while vane 45, slightly downstream with respect to vane 44, also by progressive deflection, folds mat ribbon 30A toward the uppermost surface of the same mandrel extension 41A, but over mat ribbon 30B. In a similar fashion, the upper surface of mandrel extension 41B is covered first by mat ribbon 30D, folded by vane 46, and then by mat ribbon 30C, folded by vane 47; the uppermost surface of mandrel 41C is covered first by ribbon 30F, folded by vane 48, and then by ribbon 30E, folded by vane 49.

Vanes (not shown) similarly fold the lower portion of each ribbon under the corresponding mandrel extension.

A relatively uncomplicated forming guide 32 that is perfectly suitable for accomplishing the aforedescribed cooperative folding of the mat ribbons is shown in FIGS. 4 and 6. As shown therein, the full lateral width of a forming guide suitable for making an article 20 having a trio of hollow cavities extending therethrough may be assembled from a trio of individual subassemblies 50A, 50B and 50C.

Each subassembly 50 is, in turn, comprised of an upper and lower channel member 51 and 52, respectively, that are opposingly nested. That is, as best seen in FIG. 6, the uppermost channel member 51 has a web portion 53 and two lateral side flanges 54 and 55 that extend outwardly of the web portion 53 in spaced, parallel relation. Similarly, the lowermost channel member 52 has a web portion 56 and two lateral side flanges 57 and 58 that extend outwardly of the web portion 56 in spaced, parallel relation. The lowermost channel member 52 is opposingly nested within the uppermost channel member 51 in that the side flanges 57 and 58 of the lowermost channel member 52 are fully embraced by the overlying side flanges 54 and 55 of the uppermost channel member 51. The turning vanes may then be formed by the web portions 53 and 56.

As best seen in FIG. 4, the web portion 53 in each subassembly 50 is not connected to the side flange 54 thereof at the upstream end of the forming guide 32 and, in fact, is separated therefrom to form a passageway 59. The separated web portion 53 is flared, along diagonal fold line 60, to form the upstream turning vane 44.

The passageway 59 extends downstream of the turning vane 44 contiguously with the side flange 54, as longitudinal portion 59A, in order to afford sufficient longitudinal spacing between the upstream and downstream vanes 44 and 45, respectively, so that the upstream vane 44 will not interfere with the mat ribbon to be turned by the downstream vane 45. The above mentioned fold line 60 extends from the upstream end of side flange 55 (where it joins web portion 53) diagonally downstream to intercept passageway portion 59A.

At the downstream terminus of portion 59A, the passageway 59 angles transversely across the web portion, as diagonal portion 59B, for a lateral extent compatible with that required to allow unobstructed passage of the mat ribbon 30A as it is being turned by vane 45. A further portion 59C extends longitudinally from the terminus of portion 59B, and the web portion 53 is also flared along fold line 61 to form the downstream turning vane 45. The fold line 61 extends from the side flange 54 at the juncture of passageway portions 59A and 59B diagonally downstream to intercept the passageway portion 59C.

The turning vanes on each subassembly 50 may be similarly formed, and the three subassemblies laterally juxtaposed to constitute a forming guide 32 suitable for folding the mat ribbons herein disclosed for reinforcing article 20.

Upper and lower mounting brackets 62 and 63, respectively, extend across the subassemblies 50 and are attached to each by means not shown. The mounting brackets are, in turn, secured to frame support members 64A and 64B by the bolts 65 and spacers 66 best seen in FIG. 6.

The baffle walls 39C and 39E which separate the adjacent ribbons of mat as they approach the forming guide 32 are aligned with the juxtaposed side flanges of the laterally adjacent subassemblies 50 which comprise the forming guide 32.

Downstream of the forming guide 32 — and preferably spaced therefrom as at 67 to allow visual inspection of the dry folded mat ribbons — is the exposure chamber 33. It is within the exposure chamber that the folded mat ribbons are first exposed to the liquid resin.

The particular type of resin selected will be chosen for its characteristics with respect to the specific service conditions it will need to endure. Among those resins generally suitable for pultrusion are the polyesters, the vinyl esters and the epoxies. Additional factors which may be considered in selection of the resin are viscosity, gel time, percentage of elongation after curing and cost. Ingredients such as pigments, catalysts, fillers and others are common additives to a resin mixture, and the term resin as used hereinafter is intended to include any mixture of ingredients generally suitable for pultrusion. The foregoing resins are generally cured by heat, and the reaction is ordinarily initiated in the range of 250° to 280° F., but because the reaction is exothermic, the temperature may rise to over 400° F. and it is therefore understood that the temperature ranges will vary with respect to the type of resin selected.

Returning now to a description of the exposure chamber 33, it generally comprises an open ended tray, designated generally by the numeral 68, having a base 69 with side walls 70 and 71 extending upwardly therefrom. The side walls 70 and 71 lightly embrace that portion of mat ribbons 30A and 30F which are to be encapsulated in the lateral side walls 23 and 24 of the pultruded article 20, and those portions of mat ribbons 30A, 30C and 30E which are to be encapsulated within the lower face wall 22 lightly engage the base 69 of the exposure chamber 33. A plurality of cross plates 72 extend transversely of the chamber 33 between the side walls 70 and 71 to reinforce the side walls and also lightly to engage those portions of mat ribbons 30A, 30C and 30E which are to be encapsulated within the upper face wall 21. This light engagement by the structural components of the exposure chamber against the folded mat ribbons in combination with the engagement of the folded mat ribbons against the mandrel extensions 41A, 41B and 41C around which the mat ribbons are folded serves to maintain the mat ribbons in their precise configuration as they are drawn through the exposure chamber.

The exposure chamber 33, which may be secured to frame support members 64 by mounting brackets 73, is continuously supplied with resin R via a feeding trough 74. The resin is supplied to the trough 74 by a pump means 75, hereinafter more fully described, and flows down the inclined trough 74 and onto the upwardly exposed surfaces of the previously folded mat ribbons. A box frame 76 rests upon the uppermost edges of the side walls 70 and 71 of the open ended tray 68 so that the side walls 78 and 79 of the box frame 76 effectively extend the dimension of the side walls 70 and 71 vertically upwardly of the folded mat ribbons. The box frame 76 also incorporates end walls 80 and 81 which extend transversely of the exposure chamber, thus completing a dam by which a bath B of resin is maintained in contact with the upwardly directed surfaces of the folded mat ribbons 30.

While some resin may seep between and around the folded mat ribbons, experience has shown that even though the amount of resin deposited on, and carried into the die 34 with, the upwardly directed surfaces of the folded mat ribbons 30 is in excess of the amount required to impregnate the ribbons completely, the ribbons will only be partially wetted, thus preserving at least a modicum of tensile strength to the ribbons so that they will fully maintain their integrity as they are drawn into the die 34.

In order to assure that a sufficient amount of resin is carried into the die 34 from the exposure chamber 33, preferably an excess amount of resin R is supplied to the bath B by trough 74. The overflow exists over a weir 82 such as shown to be provided in one side wall 71 of the box frame 76. The exiting resin returns to a reservoir tray 83 (FIGS. 8 and 9) located beneath the exposure chamber 33 to be recycled by pump means 75.

Figure 2:
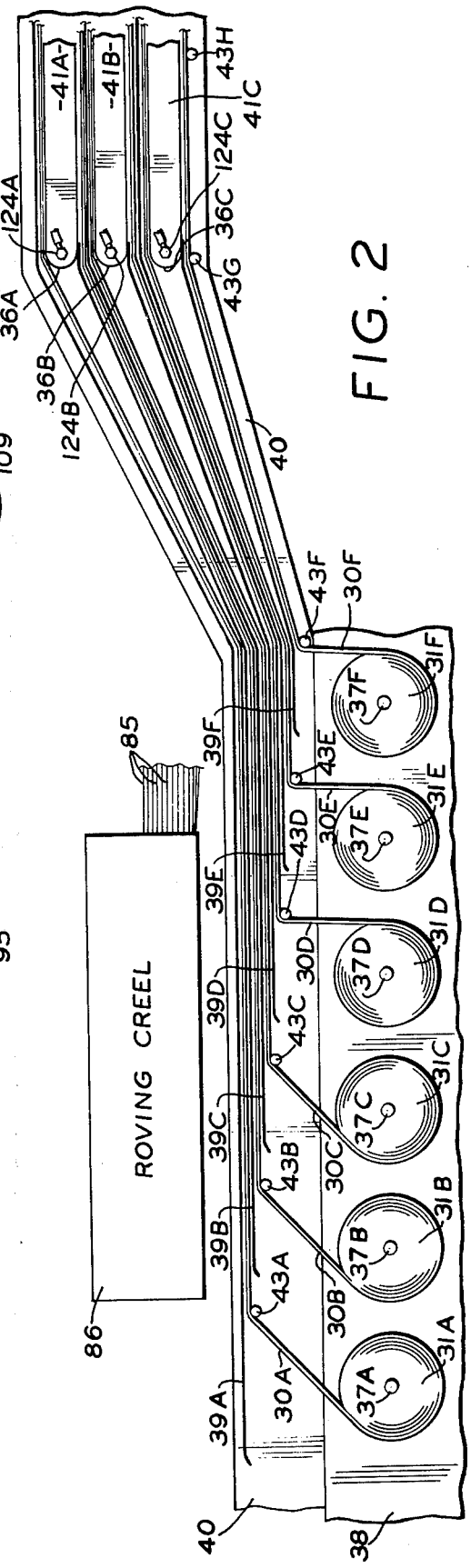
FIG. 2 is an enlarged, top plan of a portion of the apparatus represented in FIG. 1 taken substantially on line 2—2 of FIG. 1 and depicting a typical bobbin arrangement for supplying ribbons of mat reinforcing.
Figure 3:
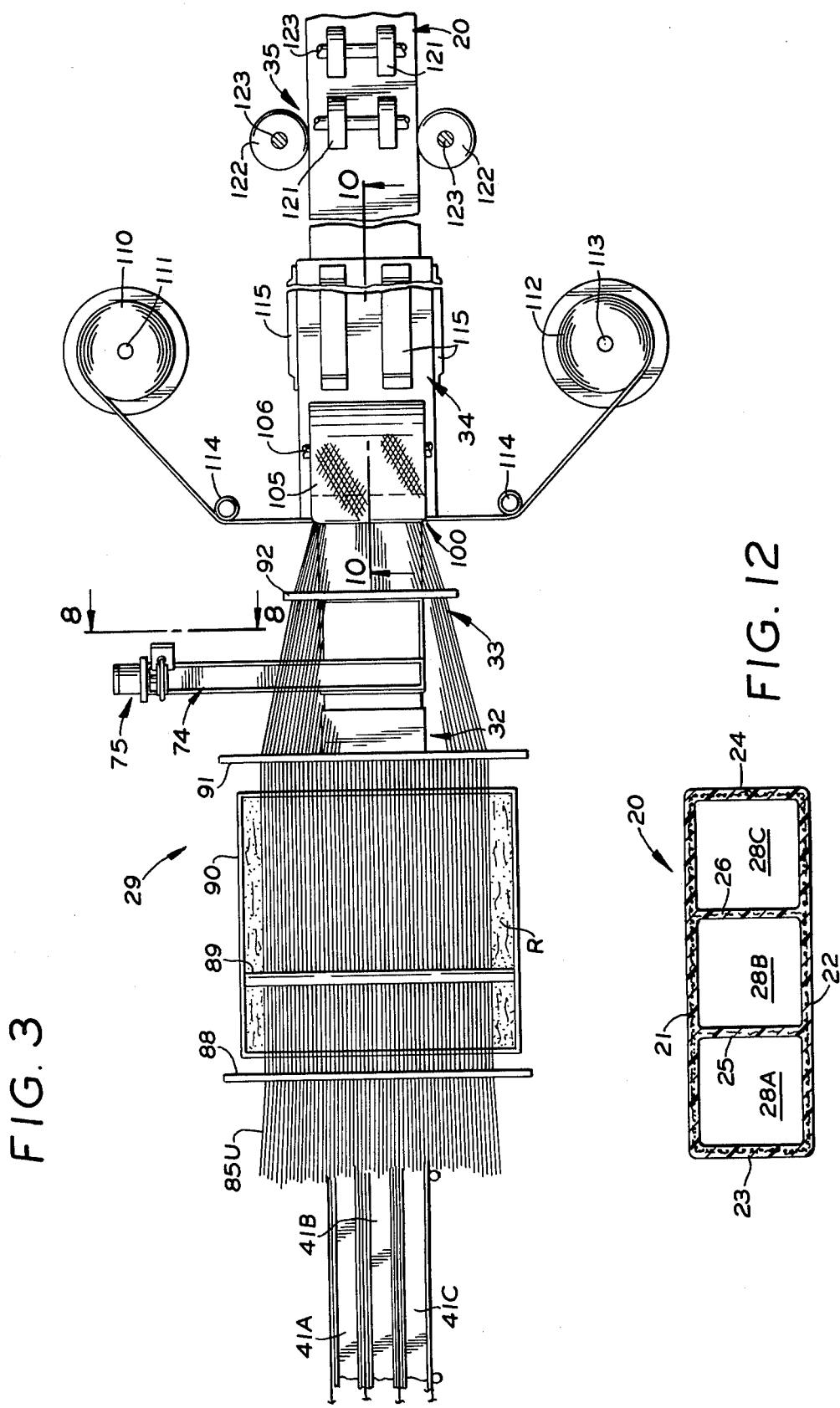
FIG. 3 is an enlarged, top plan view of a portion of the apparatus shown in FIG. 1.

As can best be seen by reference to FIGS. 1 and 3, many individual, continuous strands of fiber glass roving, referred to singularly and/or collectively by the numeral 85, are drawn from convenient roving creel means 86 (FIG. 2) in proximity to the mat ribbon creel means 38. Those strands 85L destined to be incorporated in the lower face wall 22 and adjacent portions of the lateral side walls 23 and 24 are conveniently directed from the roving creel means 86 beneath the path of the mat ribbons 30 at the dog-leg in slideway 40. Those strands 85U destined to be incorporated in the upper face wall 21 and adjacent portions of the lateral side walls 23 and 24 are conveniently directed from the roving creel means 86 above the path of the mat ribbons 30 in slideway 40.

Although satisfactory results can be achieved by drawing the longitudinal reinforcing material directly into the die, when the longitudinal reinforcing material is a roving comprised of a multiplicity of individual filaments it is considered preferable to pre-soak the roving in order to achieve the fullest possible penetration of the resin into the interstices between the individual filaments within the roving. This pre-soaking may be easily achieved by passing the upper strands 85U through a separating and aligning comb 88 and then beneath an immersion bar 89 within a resin tray 90 so that each strand is fully impregnated with resin R. The upper strands 85U are then directed upwardly out of the tray 90 over a first guide comb 91 and into the die 34 through a portion of the second guide comb 92. The lower strands 85L similarly pass through a separating and aligning comb 93 and then beneath an immersion bar 94 within a resin tray 95 so that each strand is also fully impregnated with resin R. The lower strands 85L are then directed out of the tray 95 through a first guide comb 96 and into the die 34 through a portion of the second guide comb 92. When the strands 85 are thus pre-soaked an additional means by which to introduce an excess amount of resin into the die 34 is also thereby achieved.

The second guide comb 92 is common to both the upper and lower strands 85U and 85L and fully encompasses the periphery of the die 34 shortly upstream thereof.

At approximately the mouth 100 (FIG. 10) of die 34 each mandrel extension 41 is secured to a corresponding mandrel 42 that extends longitudinally within and through the throat portion 102 of the die 34 itself. In the embodiment depicted, the throat portion is of uniform cross section, but the cross section of each mandrel expands from the mouth 100 of the die to a reference plane 103 located downstream of the mouth but still within the die 34. As such, the expanding cross section of each mandrel 42 cooperates with the fixed cross section of the die throat to create a hydraulic pressure on the resin R within the passageway extending from the mouth 100 of the die 34 to the reference plane 103 that constitutes the constricting canal which fully impregnates the folded mat ribbons with a portion of the excess resin carried into the die by the folded mat ribbons 30 and/or roving strands 85. Although the arrangement heretofore described works quite satisfactorily, it should be appreciated that the cooperative cross sectional dimension necessary to achieve the hydraulic pressure required to effect full resin impregnation may well also be achieved by tapering the throat 102 of the die 34 from the mouth 100 to reference plane 103 either with, or without, a corresponding taper to the mandrels 42.

As previously mentioned, it may also be desirable to utilize an outer layer of film, or other nonfibrous material, within the article 20. Such a mat could be employed to provide desired surface characteristics to the article 20 as well as to assist in the provision of the requisite physical characteristics of the finished article.

To avoid, or at least minimize, shaping of the additional mat layer, it is desirable to select a mat having a width equivalent to the width of the surface to which it will be applied. Thus, a roll of mat material 105, having a width commensurate with that of the upper face wall 21 of article 20, is carried by a spindle 106 directly above the die 34, while a roll of similar width mat material 108 is carried by another spindle 109 directly below the die 34. A third roll of mat material 110, having a width commensurate with that of side wall 23 is carried by spindle 111 at one side of die 34, and a roll of similar width mat material 112 is carried by a spindle 113 at the opposite side of the die 34. Rollers 114 may be positioned to guide the additional mats to the entrance of the die.

The additional mat strips are applied dry directly over the roving strands 85 at the mouth 100 of the die 34. The excess resin carried into the die 34 on the mat ribbons 30 and/or by the roving strands 85 not only provides the source of resin to complete impregnation of the mat ribbons 30 but also supplies the sole source of resin to impregnate, by virtue of the hydraulic pressure heretofore explained, the outer layers of mat 105, 108, 110 and 112 fed dry into the die 34. Any excess resin not used in the final impregnation on the folded mat ribbons 30 or in the impregnation of the outer mats 105, 108, 110 and 112 flows downwardly from the mouth 100 of die 34 and into the reservoir tray 83.

Figure 10:
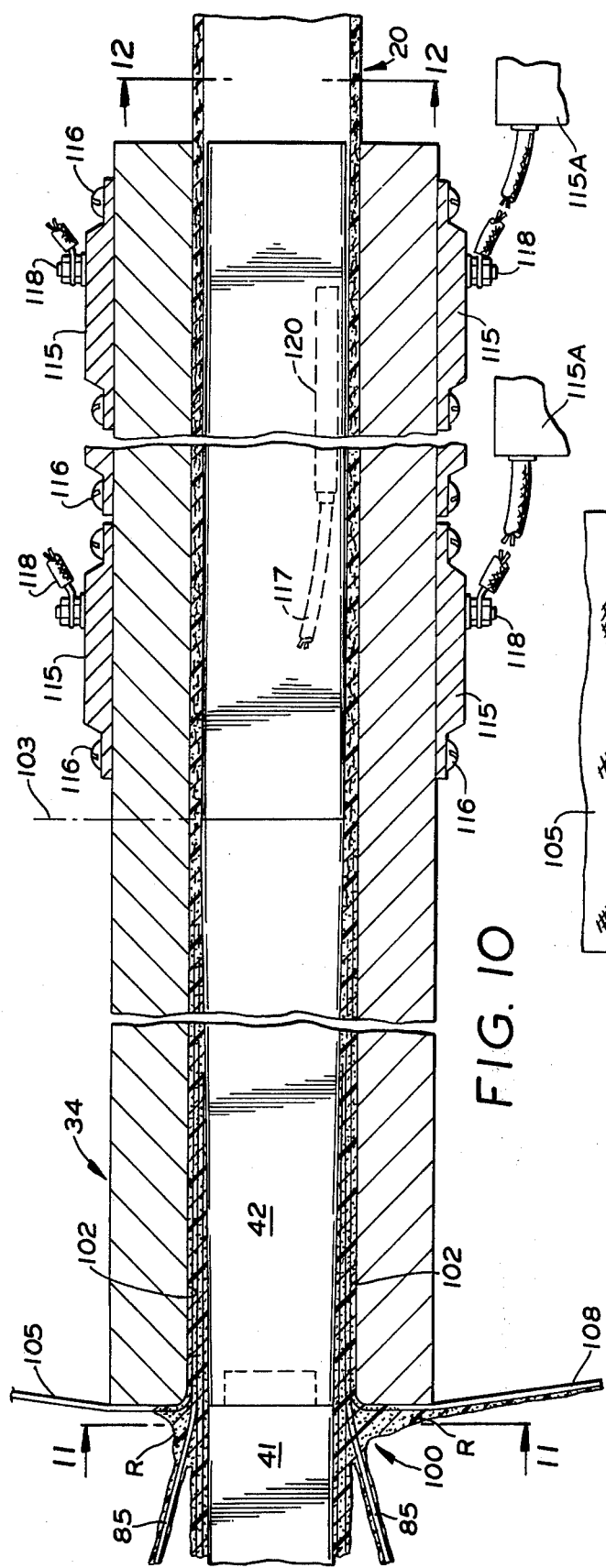
FIG. 10 is an enlarged, vertical section taken substantially on line 10—10 of FIG. 3, and depicting the interrelationship of the die to one of the mandrels.
Figure 11:
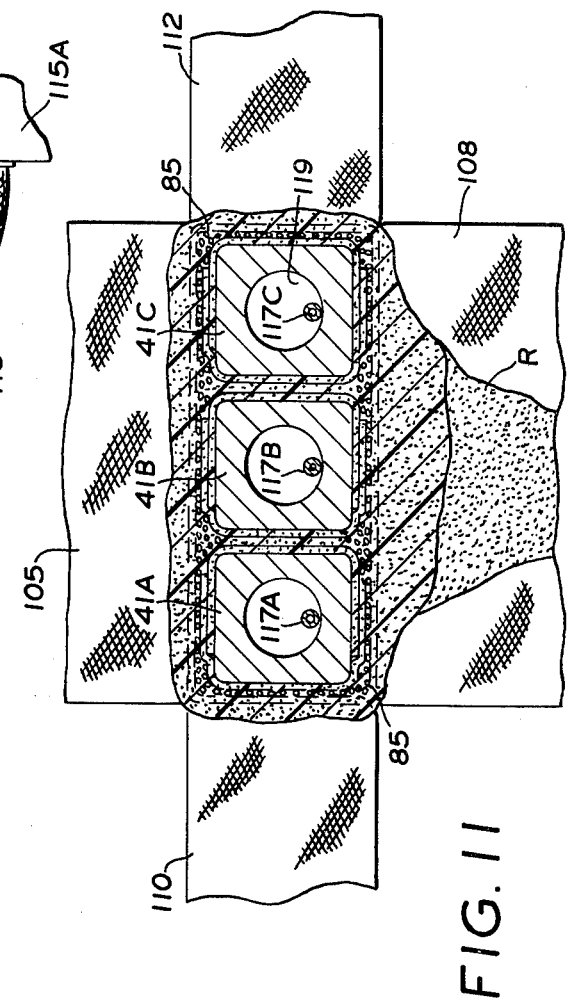
FIG. 11 is a vertical section taken substantially on line 11—11 of FIG. 10, depicting the relationship of the reinforcing elements and the resin at the mouth of the die.

A plurality of heating elements such as the electric variety 115 depicted in FIG. 10 may be secured to the die 34 as by screws 116, preferably downstream of the reference plane 103 and supplied by electricity through terminals 118. The temperature range required most efficiently to initiate the cure will depend upon the particular resin selected so that heating elements 115 are preferably controlled by rheostats 115A. In order further to facilitate the knowledgeable application of heat the mandrels 42 are preferably themselves hollow, as at 119, to receive thermocouples 120 which are connected by wires 117A, 117B and 117C, extending to leads 124A, 124B and 124C in curved plates 36A, 36B and 36C by which the curing temperature within the article can be monitored. In some situations it may also be desirable to employ a heating element (not shown), or a series thereof, within each mandrel and have these heating elements individually controllable.

It has been found highly desirable to control the heating elements in independent stages along the longitudinal extent of the die and preferably beyond the reference plane 103 in order selectively to vary the location at which the cure is effected. This, in combination with a tapering constriction in the cross sectional dimension of the mandrel downstream of reference plane 103, affords the operator a relatively easy way to dislodge any undesirable deposits of cured resin that may occasionally build up within the throat of the die.

In order to achieve this capability the operator normally controls the heat to effect the cure in proximity to the downstream end of the die 34. Then, should the surface of the article 20 emerging from the die exhibit the telltale depression which evidences the undesirable deposit, he need merely control the heat to effect the cure in closer proximity to reference plane 103, thus effecting the cure upstream of the undesirable resin deposit so that the cured article will itself scour the deposit from the throat of the die. As soon as the surface of the emerging article reveals that the deposit has been removed, the operator may adjust the application of heat so as to effect the cure further downstream.

In addition, the constricting taper of the mandrel reduces friction against the interior of the article if the resin selected should be of the variety that shrinks during the cure.

The pulling mechanism 35 which continuously extracts the cured article from the die 34 may well be relatively uncomplicated. One perfectly good arrangement comprises a plurality of generally opposed upper and lower rubber roller means, such as the small tires 121 located downstream of the die, oriented to engage the face surfaces 21 and 22 of the article 20. Similar roller means 122 engage the side walls 22 and 23, and all the roller means are mounted on drive axles 123, the speed of which is synchronized with the application of heat to the die 34 in order to effect the cure at the desired location within the die 34.

Some cross sectional configurations are more subject to warping than others, and it may be desirable to apply a fine cooling spray, as of water, against selected surfaces of the article as it emerges from the die 34. This can well be accomplished by nozzles 125, as shown in FIG. 1.

Figure 9:
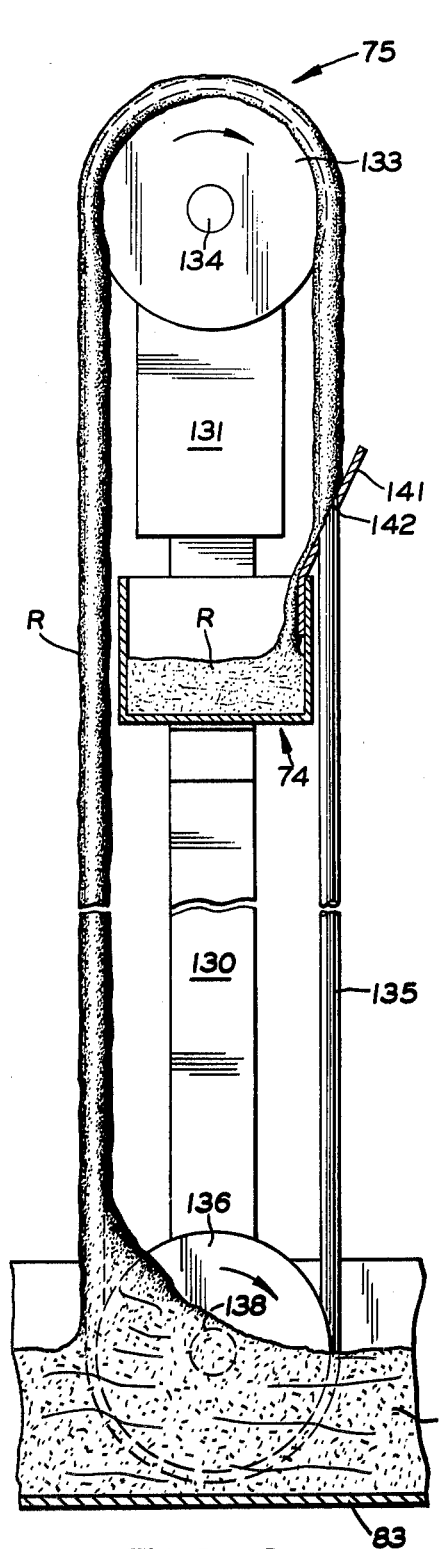
FIG. 9 is a side elevation taken substantially on line 9—9 of FIG. 8.
Figure 8:
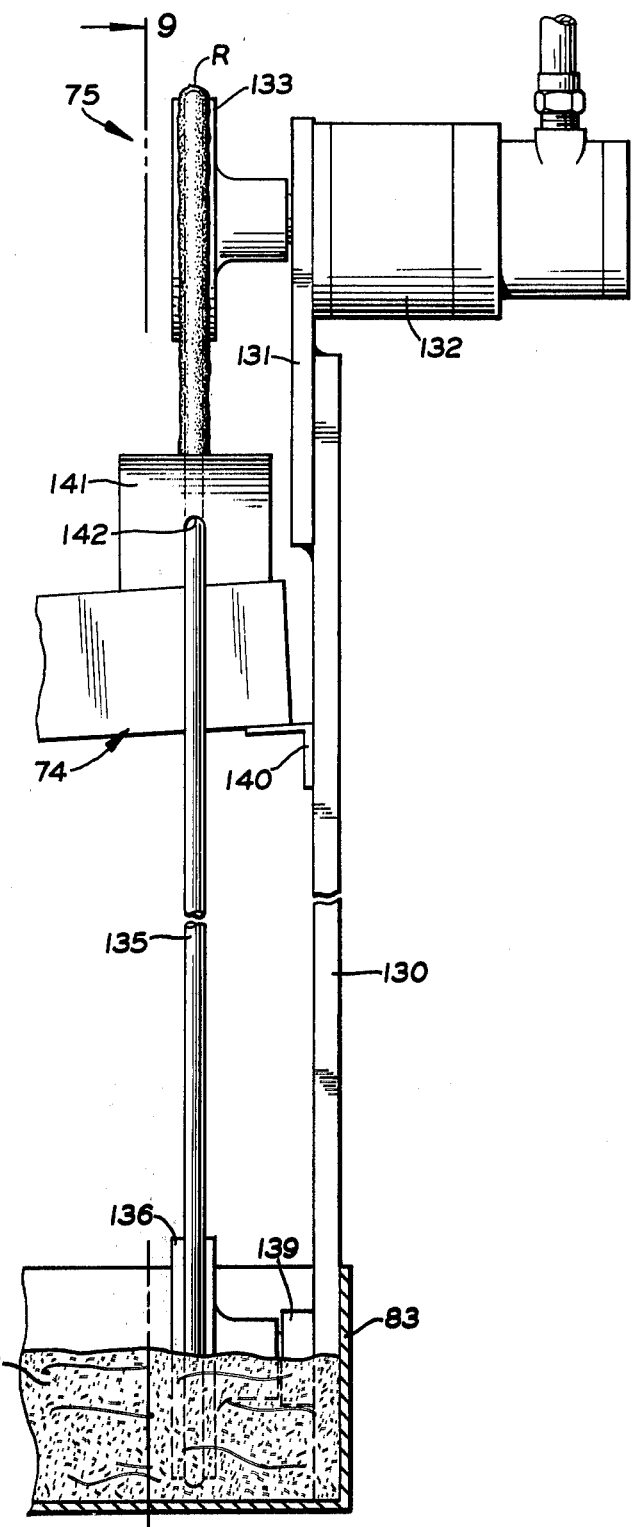
FIG. 8 is an enlarged, frontal elevation taken substantially on line 8—8 of FIG. 3, depicting the mechanism of the pump means by which resin is transferred from the resin reservoir to the supply trough for the exposure chamber.

Referring now to FIGS. 8 and 9, the pump means 75 by which a continuous supply of resin R is provided to the feeding trough 74 will be explained. The tray 83 serves as a reservoir to collect excess resin flowing down from both the exposure chamber 33 and the mouth 100 of die 34. A frame member 130 extends upwardly from the reservoir tray 83 to a point above the trough 74 and supports a bracket 131 on which a drive means such as the air driven motor 132 is mounted.

A pulley 133 is mounted on motor shaft 134 for a driving belt 135, which, in the embodiment depicted, has a circular cross section. A second pulley 136 similar to drive pulley 133 is mounted with respect to tray 83 so as to be partially immersed in resin R. Specifically, pulley 136 is mounted on an idler shaft 138 rotatably presented from a journal 139 fastened to frame member 130. As previously discussed, the resin trough 74 inclines downwardly to the exposure chamber 33, and the uppermost end may also be attached to frame member 130, as by a mounting bracket 140. A strigil means in the form of a tab 141 having a bore 142 therethrough is fastened to the resin trough 74 in a position which permits the belt 135 to pass through, and engage the perimeter of, the bore 142.

During operation of the motor 132 the belt 135 is driven around the pulley 136, partially immersed in resin, and as the belt 135 travels upwardly from the reservoir tray 83 a quantity of resin adheres thereto. After the resin laden portion of the belt 135 passes over the drive pulley 133 and begins its downward movement, it passes through the bore 142 which strips the resin therefrom. As the resin is removed from the belt 135 it flows along the tab 141 into the trough 74. The inclination of the trough 74 allows the resin to flow toward and into the exposure chamber 33 which lays a continuous deposit on the upwardly facing surfaces of the folded mat ribbons 30, as heretofore described.

Although the preferred embodiment of the apparatus 29 and the method according to which the apparatus may be operated has been described in conjunction with the pultrusion of a tri-cavity article 20 having a rectilinear cross section with two inner web walls 25 and 26, it is to be understood that the invention disclosed and claimed herein is not so limited.

The versatility of the method and apparatus disclosed and claimed herein is demonstrated by a further example of an article that can be made thereby. Such an article is represented by the beam 150 depicted in FIGS. 13 and 14.

Beam 150 has an upper face wall 151 and a spaced pair of lateral face walls 152 and 153 that are joined to the lateral edges of the upper face wall 151. A web wall 154 is joined to, and extends between, the lateral face walls 152 and 153 in parallel, spaced relation below the upper face wall 151.

It must be appreciated that, when desired, the web wall 154 may, like the web walls 25 and 26 in article 20, be of relatively thin walled section. Thin walled sections less than one eigth inch in thickness — but generally not much less than one thirty-secondth of an inch — are preferably reinforced solely by matting, often only one layer 157 as depicted in beam 150. Matting affords multidirectional reinforcement when encapsulated within cured resin and can be successfully introduced into thin walled sections by the present apparatus and according to the present method.

A flange wall 155 is conjoined to the lower edge of the lateral face wall 152 and extends in parallel, spaced relation below the web wall 154, and a similar flange wall 156 is conjoined to the lower edge of lateral face wall 153 and extends in parallel, spaced relation below the web wall 154 in opposition to flange wall 155.

Such a cross sectional configuration does not lend itself to metal extrusion, but it should now be apparent that such a cross sectional configuration can be readily pultruded in reinforced resin according to the method and on the apparatus disclosed and claimed herein. Moreover, as will now be disclosed, when pultruded according to the present invention the cross section can be provided with the higher modulus of elasticity attributable to steel reinforcement and yet maintain the light weight of aluminum or fiber glass reinforced resin. Such a result can be readily achieved by employing wire reinforcing in those portions of the cross section subject to the maximum compressive and tensile stresses.

Figure 13:
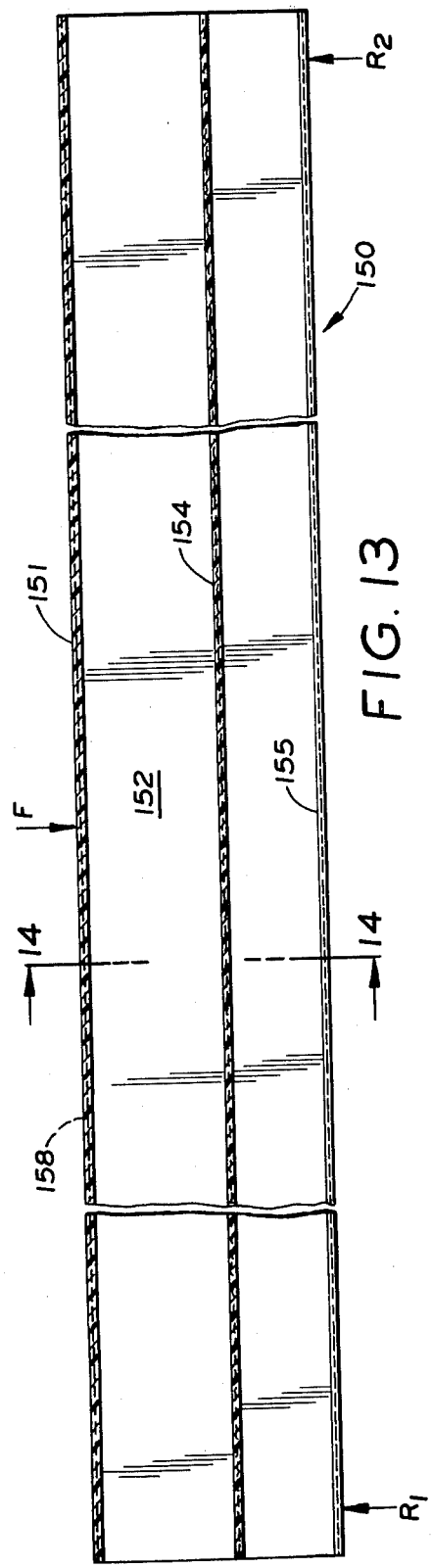
FIG. 13 is a longitudinal section through a second exemplary article that can be pultruded according to the concept of the present invention; and, FIG. 14 is an enlarged, transverse section taken substantially on line 14—14 of FIG. 13.
Figure 14:
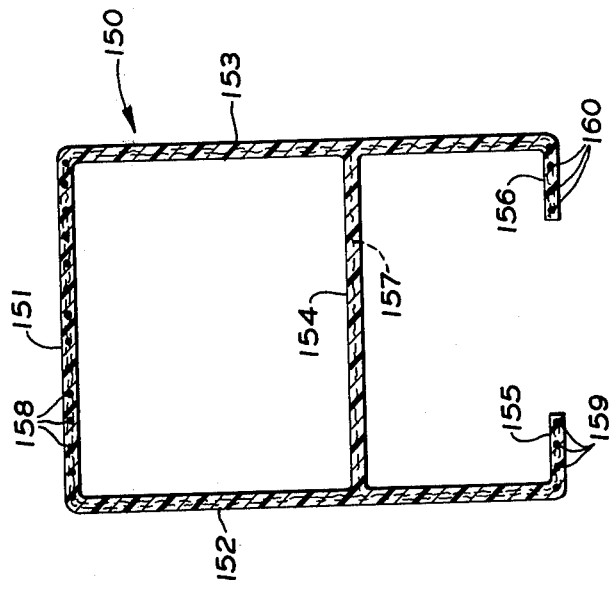

Assuming, then, that the beam 150 is subjected to a bending moment by virtue of the application of a force F downwardly of the medial portion of the beam 150 against the reaction forces $R_1$ and $R_2$ that support the end portions of the beam, as indicated in FIG. 13, the upper face wall 151 will bear the maximum compressive stress, and the opposed flange will bear the maximum tensile stress. The strength of the beam 150, therefore, can be enhanced by reinforcing those portions under maximum stress — the opposed peripheral walls — with a material having a high modulus of elasticity, and this can be accomplished as the beam is being pultruded on an apparatus embodying the concept, and according to the method, of the present invention by drawing high modulus reinforcing filaments such as steel wire into the pultrusion die along with the folded mat ribbons, roving and resin. Specifically, steel wires 158 may be incorporated within the upper face wall 151 longitudinally of the beam 150 to enhance the compressive strength and modulus of wall 151 when subjected to load F, and steel wires 159 and 160 may likewise be incorporated in the flange walls 155 and 156, respectively, to extend longitudinally of the beam and thereby enhance the tensile strength and modulus of flange walls 155 and 156. As such, the wires 158, 159 and 160 combine to increase the bending strength of beam 150.

Similar metallic reinforcing may be selectively provided in the opposed peripheral walls 21 and 22 or 23 and 24 of article 20 (depending upon which set of opposed walls will be subjected to the maximum tensile or compressive stresses) to enhance the beam strength and modulus of article 20.

The mat imparts lateral strength and stability, and the roving imparts longitudinal strength that is compounded by the judicious placement of steel wire. It can be readily appreciated that steel wire will enhance the tensile strength of the beam, but it has also been found that the cured resin will maintain the steel wire against buckling and thereby permit the wire to impart an enhanced compressive strength to the beam, as well.

As should now be apparent, an apparatus and method embodying the concept of the present invention are capable of economically pultruding an article of selected cross section which may well incorporate a plurality of hollow cavities, thin walled sections and/or be adequately reinforced with relatively inexpensive mat which may or may not be enhanced by steel wire and otherwise accomplish the objects of the invention.

What is claimed is:

1. Apparatus for the continuous manufacture of articles having upper, lower and laterally displaced peripheral walls and having hollow cavities therethrough, separated by at least one internal web wall, from fiber reinforced, thermosetting resin comprising: a die having a throat to delineate the exterior configuration of the hollow article, at least two mandrels positioned within the throat of said die to delineate the configuration of said hollow cavities and at least one said internal web wall through the article, creel means to supply a plurality of dry ribbons of fiber matting, means for directing said ribbons along and between opposing sides of said mandrels, a forming guide to incorporate each said ribbon of dry matting into at least three of said article walls and including a first turning vane to fold at least one of said ribbons directly over one said mandrel and downstream of said first vane a second turning vane to fold another of said ribbons over and in the opposite direction to said first folded ribbon and completely enclose at least one of said mandrel to form at least one said hollow cavity prior to contact with the thermosetting resin, an exposure chamber to receive the dry folded mat ribbons from said forming guide and deposit an amount of resin on a portion of said folded ribbons that is at least sufficient to impregnate all ribbons of matting with resin, means continuously to draw said mat ribbons from said creel means, along said means for directing, through said forming guide and exposure chamber and between said mandrel and die, and means to heat said die.

2. Apparatus, as set forth in claim 1, in which means are provided to feed additional resin between said die and mandrels to complete impregnation of said folded mat ribbons within said die.

3. Apparatus, as set forth in claim 1, wherein said exposure chamber comprises; a bath means for applying resin over the upwardly directed surface of the fiber matting within said exposure chamber.

4. Apparatus, as set forth in claim 3, wherein the resin is supplied from a reservoir to said bath means by a feeding means comprising, a pump means and a trough means to conduct the resin from said pump means to said bath means.

5. Apparatus, as set forth in claim 4, wherein said pump means comprises; a first pulley, means to drive said first pulley, a second pulley rotatably mounted in a resin reservoir, and belt means passing around said first and second pulleys for conveying the resin to said feeding means.

6. Apparatus, as set forth in claim 5, in which a strigil means is provided to strip the resin from said belt means and into said trough means.

7. Apparatus, as set forth in claim 2, wherein said means to feed additional resin between said die and mandrels comprises; roving reinforcing strands, a second resin bath means, and guide means to direct the roving through said second resin bath and between said die and mandrels.

8. Apparatus, as set forth in claim 1, wherein the cross sectional dimensions of said die and said mandrels cooperate by tapering to effect a hydraulic pressure between said die and said mandrels to impregnate said fiber matting with the resin.

9. Apparatus, as set forth in claim 1, wherein said means to heat said die comprises; a plurality of heating means mounted along the axis of said die and means controllably to energize said heating means.

10. Apparatus, as set forth in claim 9, wherein the cross sectional dimensions of said mandrels are tapered to cooperate with the cross sectional dimensions of the die in the area affected by said heating elements.

11. Apparatus, as set forth in claim 1, wherein the mandrels are hollow and are provided with thermocouples for determining the temperature within the hollow article.

12. Apparatus, as set forth in claim 1, wherein the resin used is selected from the class comprising; the polyesters, the vinyl esters and the epoxies.

13. Apparatus, as set forth in claim 1, wherein said fiber matting is of the continuous strand type.

14. Apparatus, as set forth in claim 1, wherein said fiber matting is of the jackstraw type.

15. Apparatus, as set forth in claim 1, comprising means to supply an additional layer of material to said fiber matting prior to entrance into said die.

* * * * *